(12) United States Patent
Salgado et al.

(10) Patent No.: US 8,397,151 B2
(45) Date of Patent: Mar. 12, 2013

(54) INTEGRITY OF LOW BANDWIDTH COMMUNICATIONS

(75) Inventors: Stephanie Salgado, Meudon (FR); David Vigilant, Meudon (FR); Guillaume Fumaroli, Meudon (FR)

(73) Assignee: Gemalto SA, Meudon (FR)

( * ) Notice: Subject to any disclaimer, the term of this patent is extended or adjusted under 35 U.S.C. 154(b) by 284 days.

(21) Appl. No.: 12/444,884

(22) PCT Filed: Oct. 3, 2007

(86) PCT No.: PCT/IB2007/002928
§ 371 (c)(1),
(2), (4) Date: Apr. 9, 2009

(87) PCT Pub. No.: WO2008/044112
PCT Pub. Date: Apr. 17, 2008

(65) Prior Publication Data
US 2010/0103830 A1    Apr. 29, 2010

(30) Foreign Application Priority Data

Oct. 9, 2006   (EP) .................................. 06291568

(51) Int. Cl.
*G01R 31/28* (2006.01)
*G06F 11/10* (2006.01)
*H04J 1/16* (2006.01)

(52) U.S. Cl. ......... 714/799; 714/807; 370/252; 370/242
(58) Field of Classification Search ................. 370/252, 370/230.1, 231, 235, 253; 714/715, 781, 714/799, 807
See application file for complete search history.

(56) References Cited

U.S. PATENT DOCUMENTS

| | | | |
|---|---|---|---|
| 5,604,487 A | 2/1997 | Frymier | |
| 6,577,229 B1 * | 6/2003 | Bonneau et al. | 340/10.41 |
| 6,961,893 B1 * | 11/2005 | Mukund et al. | 714/781 |
| 7,010,469 B2 * | 3/2006 | Anderson et al. | 702/194 |
| 7,577,896 B2 * | 8/2009 | Uzrad-Nali et al. | 714/758 |
| 7,697,535 B2 * | 4/2010 | Patel et al. | 370/392 |
| 2003/0063606 A1 * | 4/2003 | Odenwalder et al. | 370/389 |
| 2005/0071131 A1 | 3/2005 | Anderson et al. | |

FOREIGN PATENT DOCUMENTS

WO    WO 03084078 A    10/2003

* cited by examiner

*Primary Examiner* — Michael Thier
*Assistant Examiner* — Awet Haile
(74) *Attorney, Agent, or Firm* — The Jansson Firm; Pehr B. Jansson

(57) ABSTRACT

The invention relates to a method for checking the integrity of a set of data packets received by a receiving communication device from a sending communication device, the data packets of the set being received in unpredictable order. The invention also relates to a communication device implementing a method according to the invention, in particular to a smart card.

17 Claims, 2 Drawing Sheets

```
pac = receive_packet ( )
s = read_set_id (pac)
nb_received_packets[s] = nb_received_packets[s] + 1
i = read_packetindex (pac)
if i = L
     checksum[s] = extract_set_integritycheck(pac)

pl = extract_payload (pac)
manage_payload (pl)
int_crc_pl = CRC ( pl )

free (pl)
for p = 1 to floor((L-i)*k/t)
     int_crc_pl = CRC (int_crc_pl)

si = (L-i)*k mod t
r[s] = r[s] XOR CRC (hi_{t,si}(int_crc_pl)) XOR ((lo_{t,t-si}(int_crc_pl)) << si if nb_received_packets[s] = L if r[s] = checksum[s]
          validate_s (s)
     else
          request_resend (s)
     r[s] =0
```

Figure 2

INTEGRITY OF LOW BANDWIDTH COMMUNICATIONS

BACKGROUND OF THE INVENTION

1. Field of the Invention

The invention relates to a method for checking the integrity of data communications. The invention is particularly relevant in the context of data communications between two communication devices connected via a low bandwidth network.

The invention also relates to a communication device, in particular a smart card, embedding such a method.

2. Description of the Related Art

Communication devices are electronic devices comprising a communication interface. Examples of communication devices include smart cards, USB keys, dongles, Personal Digital Assistants (a.k.a PDAs), mobile phones, personal computers (a.k.a PCs), etc. Typically, such communication devices may be interconnected and communicate with others. For example, a mobile phone may comprise a game console and may allow its user to play games together with multiple other users of similar mobile phones, all mobile phones being connected to a game server or to a plurality of game servers.

Data typically need to be communicated in the form of data packets. A packet is a formatted block of information. A packet generally consists of at least two elements. The first element is a header, which normally marks the beginning of the packet and may contain communication information such as sending and receiving addresses. The second element is a data area (or payload), which contains the information to be carried in the packet. A third element of packet may be a trailer, which marks the end of the packet. The term "packet" is not always used. For example in the context of ISO 7816-3 smart cards the term APDU, for Application Protocol Data Unit, is used instead, at the level of the ISO 7816-3 protocol. However the actual formatting of the data communicated between two communication devices generally corresponds to the above definition of a packet. For example an APDU can be viewed as a packet. The use of packets is often required by the hardware equipment and/or low level protocols forming the communication interface. Packets are extremely useful when a large piece of data exceeding the capacity of the communication interface needs to be transmitted. In such case, data is divided into packets by the sending communication device and reconstructed by the receiving communication device. However, as will be seen more in details below, in the context of the invention, packets are preferably independent one from each other. Although certain types of packets can hold a lot of data (for example IP packets can contain several kilobytes of data), some applications rely primarily on packets containing a small payload. In such applications, each payload is typically independent, in the sense that it forms a logical unit of data, which is self sufficient. In other words, each such payload can be used by the receiving communication device without waiting for other data packets. Indeed, a logical unit of data is typically not broken up in small packets, but rather transmitted in a single packet, unless it is too big in which case it is typically broken up in several maximum size packets. This is due to the fact that there is an overhead for each data packet, therefore one typically tries to use as little data packets as possible. This is also due to the fact that breaking up a logical unit of data in multiple packets requires that the receiving communication devices reconstruct the logical unit of data from several data packets, which can be a tricky task. It should be noted that when a time critical logical unit of data is ready for transmission in the sending communication device, it is often sent immediately in order that the receiving communication device can use it as soon as possible, therefore the sending communication device typically does not wait until more data is available (which would have allowed to fill a bigger packet).

As well known in the art of telecommunications, communications between communication devices are typically prone to errors. Errors are not problematic in certain applications (e.g. a small noise in an analog telephone voice communication) but might have tragic consequences in other applications (e.g. real time transmission of an aircraft altitude to some navigation equipments). Depending on the type of data, errors may have different effects.

With certain types of data, which are referred to as fault resistant data, errors only affect the actual erroneous part of the data. For example, errors in an ASCII text document typically only affect the erroneous characters, and all others characters remain readable. Similarly, errors in uncompressed bitmap image only affect the erroneous pixels, while other pixels remain perfectly visible. Errors in uncompressed digitized sounds only affect the samples which bytes are erroneous, which creates a noise at the level of the sample when the sound is played.

On the other hand, certain data are very sensitive to errors. We refer to such data as fault sensitive data. For example, if a single bit of encrypted data is erroneous, the whole encrypted data is typically complete nonsense once decrypted, and sometimes it can't even be decrypted. If a computer file containing the binary code of a program has even a single bit wrong, it can prevent the program from running or render it unusable. Similarly, errors in certain compressed data (for example a ZIP computer file) typically result in the compressed data being corrupted and impossible to decompress properly, even if the errors only affect a negligible portion of the compressed data. The same is true for many computer binary files.

The error ratio in a data communication is the ratio of the number of incorrect bits (or symbols) to the total number of bits (or symbols) received. It is referred to as the BER, which stands for Binary (or Bit) Error Rate (or Ratio, depending on the authors) and has been subject to intense study by mathematicians, physicists and engineers over the last century. Different techniques have been devised not only to identify errors but also to correct them. Some techniques are generic (i.e. independent of the actual communication channel), for example error correction codes such as Reed Solomon codes, Viterbi codes, Turbo codes and the like, while others are specific to and/or optimized for certain communication channels (e.g. radio relay system in the HF band, satellite links, optical fibers, etc.). However, error correction techniques do not work above a certain BER. Conversely, in some data communications, the reliability is fairly high and the BER is statistically so low that no correction technique is implemented, in particular when the transmitted data are not critical.

Therefore errors may happen from time to time and remain unnoticed in most data communications.

Another known problem with data communications taking place over a network such as the Internet network is the following. Not all packets necessarily travel trough the same path when going from a sending communication device to a receiving communication device. Typically, devices known as routers decide how to route packets, i.e. which path the packet shall follow in order to reach its destination, based on different criteria, such as load balancing, network congestion, etc. Due to the fact that different path can be followed by different packets, the receiving communication device can receive packets in an order different from the order in which they were sent.

It is also possible that some packets are lost (they can be treated as erroneous packets, for example), or on the contrary duplicated (in which case it may be decided, for example, that the first one is taken into account and the subsequent ones are discarded).

Typically, the two main problems mentioned above, namely the packet errors and the wrong order of packets, are addressed by upper layer communication protocols.

For example, since the IP protocol does not deal with errors in the packet payload and with wrong packets order, it is possible to use the TCP protocol over the IP protocol (TCP/IP), which provides a reliable connection by detecting erroneous packets and asking the sending communication device to resend them, and by reordering the received packets. TCP uses a 32-bit sequence number that counts bytes in the data stream. Each TCP packet header contains the starting sequence number of the data in that packet, and the sequence number (called the acknowledgment number) of the last byte received from the remote communication device. With this information, a sliding-window protocol can be implemented.

Unfortunately, such upper layer protocols are typically complex and may consume more bandwidth than available. For example, the TCP header is at least 160 bits long, and may be longer in case optional fields are used. It is a serious impediment in an environment were the payload of the packets is small, e.g. of the same order as a TCP header. If the payload of an average packet is around 20 bytes, then TCP header alone (not considering the additional IP header, plus underlying low level protocols overhead) doubles the bandwidth requirement. Therefore, for many applications TCP is not appropriate. TCP is a complex protocol. In addition, with many TCP implementations, the application cannot access packets coming after a lost packet until the retransmitted copy of the lost packet is received. This causes problems for real-time applications such as streaming multimedia (for example Internet radio), real-time multiplayer games and voice over IP (VoIP) where it is sometimes more useful to get most of the data in a timely fashion than it is to get all of the data without any error.

In the Internet case, simpler protocols are available, for example UDP over IP, however UDP does not provide packet ordering, and does not manage erroneous packets although erroneous packets can be detected thanks to a CRC. UDP is not optimal either in terms of bandwidth consumption.

SUMMARY OF THE INVENTION

It is an object of the invention to propose a method for reliable communication which allows to minimize bandwidth consumption while not requiring a significant increase in the communication device resources consumption. The most significant resources which should be preserved are CPU resources and memory resources. Indeed the processor performance and the available memory might be limited, in particular in resource constrained communication devices such as smart cards.

According to the invention, a preferred method for checking the integrity of a set of data packets received by a receiving communication device from a sending communication device, the data packets of the set being received in unpredictable order, consists in initializing an intermediate integrity check value, and carrying out the following steps.

Each time a data packet of the set is received, the receiving communication device updates the intermediate integrity check value by processing the payload of the received data packet.

The receiving communication device receives an integrity check value from the sending communication device, the integrity check value having been calculated by processing the payloads of all sent data packets of the set.

The integrity check is considered successful if, once all data packets of the set are received, the intermediate integrity check value is equal to the received integrity check value.

This method is particularly advantageous for several reasons. In particular, the method only needs to transmit an integrity check per set rather than transmitting one integrity check per data packet. This reduces the bandwidth consumption accordingly.

The number of packets per set has to be determined depending in particular on the BER of the communication network linking the communication devices. If the BER is very low, it is usually possible to put plenty of data packets per set, while if the BER is quite high, fewer data packets shall be put, since the likelihood of errors in a big set might be such that the set might have to be resent multiple times. In some instances it is possible to identify the specific erroneous data packet of the set, but quite often the whole set needs to be sent again. Another element to consider when deciding how many data packets to include per set is the time necessary to send a whole set. Indeed, if a data packet is corrupted, in general the whole set needs to be resent and this is part of the time elapsed before the correct data packets are available.

The method is also particularly advantageous in the context of applications in which the payload of data packets is small. Indeed, the integrity check value has a fixed size, and transmitting one integrity check per packet (as in state of the art solutions) is therefore particularly detrimental to such applications, as the bandwidth consumption of the integrity check is proportionally a lot more important.

The method is particularly advantageous for applications in which data packets carry primarily small logical units of data. Indeed, in such applications, a data packet can be managed immediately by the receiving communication device, and removed from memory immediately after. If there are L data packets per set, L being high enough, the method of the invention saves a significant amount of memory in the communication device. The amount of saved memory is approximately (L−1) times the size of the payload (compared to state of the art methods sending one, L times bigger, packet), as each payload is typically processed and freed straight away. This memory is typically RAM memory, which is typically very scarce in certain devices. For example, a basic smart card typically contains around 1 kilobyte of RAM. If there are 20 data packets per set, and if each packet has an average 50 bytes payload, this can fill the RAM of such smart card, which would then need to be swapped to EEPROM, while EEPROM is very slow and subject to wear. In a classical method, for the same amount of integrity check values, an L times bigger data packet would have to be received and saved in memory, and then only could the integrity check be computed. In the method of the invention, once the intermediate integrity check has been computed, the data packet can be used by the communication device and freed from memory. If it turns out later on that there was an error in the data packet, it will be resent with the correct data. In this context, the method of the invention is advantageous when data packets carry primarily error resistant data (defined above). Indeed, the communication device will have an estimate of the correct data in a timely fashion, which can be very useful. With certain applications, it is unacceptable to manage the payload of a packet before being sure that the payload integrity is correct. In such applications, it is necessary to record (i.e. to "buffer") all payloads of the packets which integrity must be correct.

Compared to an alternative method in which data packets of a set would be received, sorted in memory, and processed once the last packet is received the method of the invention would also be advantageous, in that once the last packet has been received, the integrity can be checked faster than in the alternative method since only the last packet would need to be processed. Therefore the time between the reception of the last packet and the validation of the integrity of all packets would be reduced.

According to a preferred embodiment, the method according to the invention is such that the integrity check value is included in the last packet sent by the sending communication device. It should be noted that the last packet sent by the sending communication device is not necessarily the last packet received by the receiving communication device (due for example to above-mentioned routing issues). This technique is advantageous as it avoids sending a separate packet, which would generate some overhead due not only to the packet header but also to the fact that the packet should be distinguished in order that the communication device identifies it as an integrity check value packet (rather than a packet carrying a regular payload). Sending the integrity check value in the last packet requires no overhead. The integrity check value can be appended just after the payload of the last packet. It may be stored in the space dedicated to the payload of the packet, which size would be increased accordingly (e.g. by updating a payload size field).

The invention also relates to a communication device arranged to check the integrity of a set of received data packets with a method as described above. It should be noted that the receiving communication device can be the same device as the sending communication device. For example it is known that a TCP/IP smart card can host web server software, or other types of servers. Two servers inside a single smart card may have to communicate together, and there are some instances in which such communications cannot occur internally in the smart card but have to go through external devices (e.g. external certificate authority servers), in which case the invention may be advantageous.

In particular, the invention relates to smart cards, and more specifically to IP smart cards. The invention is applicable to TCP/IP smart cards, such smart card relying either on TCP or on the invention depending on the context (applications etc.). Many other devices are possible, in particular MMC type cards, SD type cards, USB tokens, or trusted modules designed to secure personal computers (such as TCPA TPM modules), high end microprocessors (such as those used for computers and servers), portable devices (such as PDAs, cellular phones, laptop computers), etc.

BRIEF DESCRIPTION OF THE DRAWINGS

The invention and its advantages will be explained more in details in the following specification referring to the appended drawings, in which FIG. 2 represents a preferred method for checking the integrity of a set of received data packets.

DETAILED DESCRIPTION OF THE INVENTION

Figure 1:
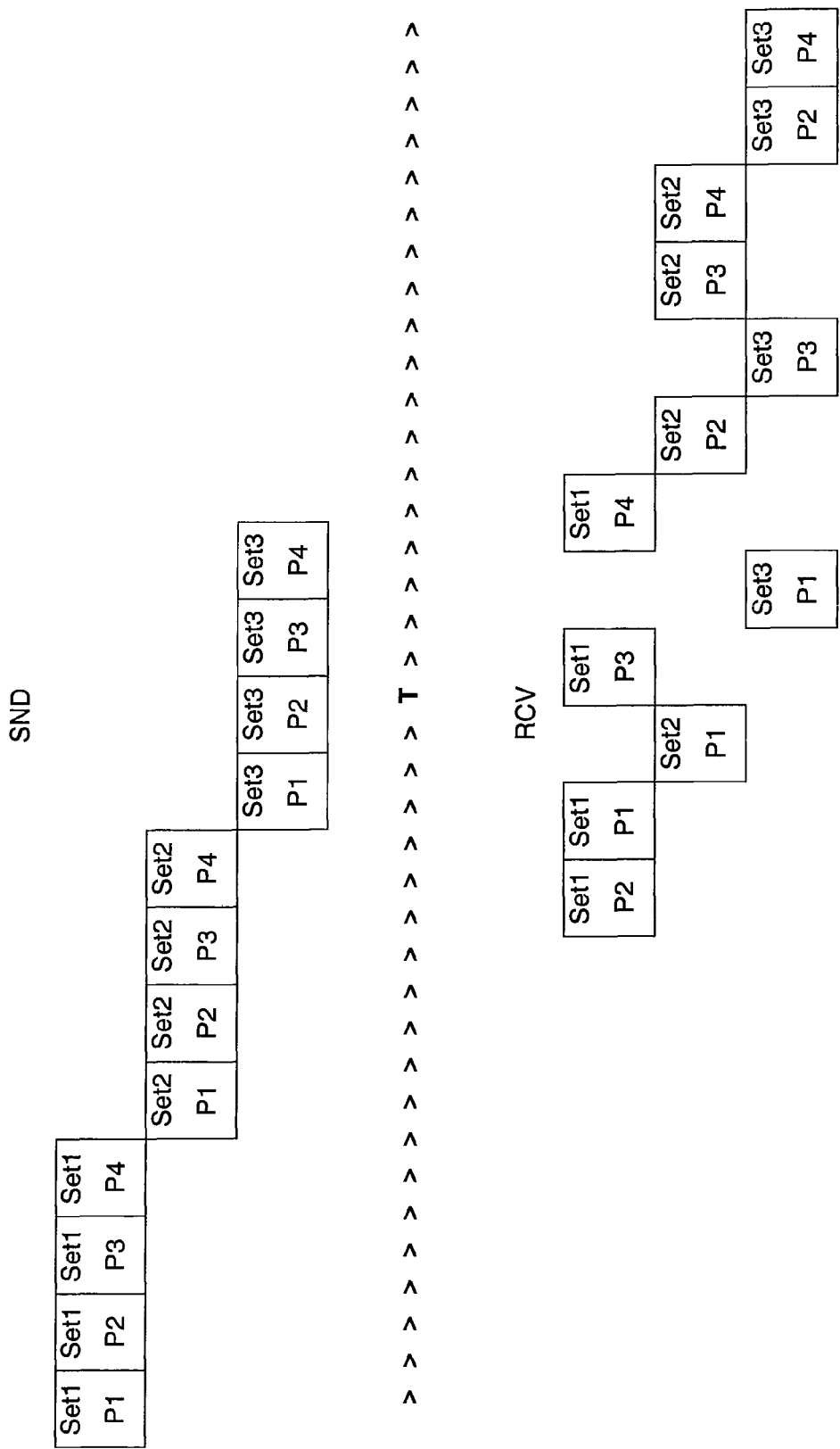
FIG. 1 shows how three exemplary sets of data packets may be received after traveling from a sending communication device to a receiving communication device.

FIG. 1 illustrates one of the problems addressed by the invention.

The top of the diagram, identified by SND, depicts some sets of packets sent by the sending communication device, while the bottom of the diagram, identified by RCV, depicts the corresponding sets of packets received by the receiving communication device. T represents the time axis. As seen at the top of the diagram, three sets of four data packets are sent consecutively by a sending communication device. Set1 is sent first, then comes Set2 and at the end Set3. Within each set, packet P1 is sent first, then goes P2, then P3 and finally P4. Each set is represented on a different line for better legibility.

However, due for example to the fact that the network is such that packets traveling between two given points do not necessarily take the same path, the packets are not received in the order that they were sent.

FIG. 1 illustrates two issues. The first issue is linked to the fact that within a given set, the order of the packets can be changed. For example, packet P2 of Set1 arrived before packet P1 of Set1. The second issue is linked to the fact that different sets can overlap, in the sense that some packets of a given set may reach the receiving communication device while not all packets of the previous set have been received yet. For example, packets P1 of Set2 and P1 of Set3 have been received before packet P4 of Set1, which was probably delayed somewhere in the network.

A method according to a preferred embodiment of the invention relies on an integrity check based on a CRC.

Other types of integrity checks are possible, as long as they satisfy the implicit requirements of the method, i.e. as long as they can be adapted to be computed based on data packets which are received in random order. For example, it is possible to use an XOR integrity check, which is also advantageous in that it is faster than CRC and typically does not need specific hardware acceleration. However, basic XOR integrity checks (consisting in dividing data to be checked in blocks and XORing all blocks together) are a bit weak in the sense that two errors at the same bit position in two arbitrarily selected blocks cancel each other and remain unnoticed. A CRC integrity check, although not very strong cryptographically, is much stronger than basic XOR as much better identifies transmission errors, while still reasonably fast. CRC integrity checks therefore represent a good performance*robustness tradeoff.

A CRC (Cyclic Redundancy Code) of length n and dimension k is defined as a set C of polynomials of degree at most n over $GF(2)$, the set C being associated with a polynomial $g(x)$ of degree n−k over $GF(2)$, $g(x)$ being called the generator polynomial, the set C being such that for every polynomial $c(x)$ of degree at most n over $GF(2)$, $c(x)$ belong to C if and only if $g(x)$ divides $c(x)$.

Polynomials $c(x)$ belonging to C are also known as, codewords $c(x)$, and can be expressed in the form $c(x)=x^{n-k}m(x)+r(x)$.

The expression "the CRC of a message $m(x)$" is commonly used to refer to the polynomial $r(x)$, which is the remainder of the division of $x^{n-k}m(x)$ by $g(x)$.

Numerous versions of CRC exist, depending in particular on the polynomial $g(x)$ which has been chosen and on the length n and dimension k. The following are well known examples of CRCs:

CRC-1 (probably the simplest one, also known as parity bit), CRC-5-CCITT (ITU G.704 standard), CRC-5-USB (used in particular for USB token packets), CRC-7 (used in certain telecom systems), CRC-8-ATM (used in ATM HEC), CRC-8-CCITT (used in 1-Wire bus), CRC-8, CRC-10, CRC-12 (used in telecom systems), CRC-16-Fletcher (used in Adler-32 A & B CRCs), CRC-16-CCITT (X25, V.41, Bluetooth, PPP, IrDA), CRC-16-IBM, CRC-16-BBS (XMODEM protocol), CRC-32-Adler, CRC-32-MPEG2, CRC-32-IEEE 802.3, CRC-32C (Castagnoli), CRC-64-ISO (used in ISO 3309), CRC-64-ECMA-182, CRC-128 (IEEE-ITU Standard, typically superseded by hashes such as MD5 & SHA-1), or CRC-160 (same comments as CRC-128).

Some CRC algorithms differ slightly from the above mathematical definition, in that they set a parameter, commonly referred to as the initial value (IV) of the CRC, to a non-zero value. The IV corresponds to the initial value of the shift register, the shift register being a register used in most implementations of CRC algorithms, as known in the art.

Unless otherwise stated, the IV is equal to zero, since this is required in order to fulfill the mathematical definition stated above. If the IV has been set to a different value, some properties of the CRC are affected. In particular the CRC of zero is no longer equal to zero. This may be useful in certain applications (for example, it may be desired that two files differing only by a number of leading zero bits nonetheless have a different CRC).

However, non-zero IVs are inconvenient in the context of the invention. Indeed, the invention makes use of the mathematical properties of the integrity check in order that it can be computed in random order without affecting the final integrity check value. Therefore, a small adaptation is needed in case a CRC algorithm with non-zero IV is used, as may be the case when a hardware accelerator (or software library) implementing such special CRC is available, and no regular CRC (with IV=0) is available.

According to the invention, in case a CRC with non-zero IV is used, a pre-computation may be performed in order to allow recovering a CRC (with IV=$IV_0$) of a given piece of data M from a function of $IV_0$ and of the CRC (with IV=$IV_1$) of the same piece of data M. This method works for any IV, in particular $IV_0$ equal to zero. Let CRC(M, $IV_0$) be the CRC of M with initial value $IV_0$.

It can be shown that CRC(M,$IV_0$)=CRC(M XOR $K_1$, $IV_1$) XOR $K_2$. The values of the first and second, constants $K_1$ and $K_2$ depend solely on the size of M, on the size of the CRC register, on $IV_0$ and on $IV_1$. Those four parameters typically do not depend on the actual value of data being manipulated which is why we use the term "constant". XOR operations (especially XOR with constants) being very fast, the method does not affect the performance too much.

To be more accurate, if a message M has a size l (in bits) greater than or equal to t, t being the output size (in bits) of the CRC (which is typically the size of the shift register), then the applicant has found that it is possible to demonstrate that:

$$CRC(M,IV_0)=CRC(M \text{ XOR }((\text{expand}_{t,l}(IV_0 \text{ XOR } IV_1))<<_l(l-t))IV_1)$$

Where:
the $\text{expand}_{t,l}$ function transforms a t-bit register into a l-bit register (l being greater than or equal to t) by padding the t-bit register with l−t leading bits equal to zero. In other words, the $\text{expand}_{t,l}$ function adds some most significant bits, which do not change the value stored in the register but simply make the register larger: $\text{expand}_{t,l}(X_{t-1}, X_{t-2}, \ldots, X_0)=0_{l-1}, 0_{l-2}, \ldots 0_t, X_{t-1}, X_{t-2}, \ldots, X_0$. The use of the $\text{expand}_{t,l}$ function is implicit and could have been omitted, but is indicated here for improved clarity;
the operator $<<_l$ is the shift left operator for l-bit registers (the length l is specified for improved clarity, although it is implicit), defined as follows. If the binary representation of X is $X_{l-1}, X_{l-2} \ldots X_0$, then the binary representation of X$<<_l$t is $X_{l-1}, X_{l-2}, X_0, 0_{l-t-1}, 0_{l-t-2}, 0_0$.

If l is smaller than t, then the applicant has found that it is possible to demonstrate that:

$$CRC(M,IV_0)=[CRC(M \text{ XOR shrink}_{t,l}(hi_{t,l}(IV_0 \text{ XOR } IV_1)),IV_1)]XOR[lo_{t,l}(IV_0 \text{ XOR } IV_1))]XOR[(IV_0 \text{ XOR } IV_1)]$$

Where:
the $\text{shrink}_{t,l}$ function transforms a t-bit register into a l-bit register (l being smaller than t) by removing the t−l most significant bits. If some of the t−l most significant bits were non-zero, then they are lost: $\text{shrink}_{t,l}(X_{t-1}, X_{t-2}, \ldots, X_0)$ is equal to $X_{l-1}. X_{l-2}, \ldots, X_0$. But here the l−t most significant bits are zero by construction;
$hi_{t,l}(X)$ is defined for numbers X represented as a t-bit register. $hi_{t,l}(X)$ is equal to the number which binary representation consists of the l most significant bits of X. In other words, if the binary representation of X is $X_{t-1}, X_{t-2} \ldots X_0$ where each $X_i$ is a bit, $hi_{t,l}(X)$ is equal to the number which binary representation in a t-bit register is $0_{t-l-1}, 0_{t-l-2}, \ldots 0_l, X_{t-1}, X_{t-2}, \ldots X_{t-l}$;
$lo_{t,l}(X)$ is defined for numbers X represented as a t-bit register. $lo_{t,l}(X)$ is equal to the number which binary representation consists of the l least significant bits of X. In other words, if the binary representation of X is $X_{t-1}, X_{t-2} \ldots X_0$ where each $X_i$ is a bit, $lo_{t,l}(X)$ is equal to the number which binary representation in a t-bit register is $0_{t-1}, 0_{t-2}, \ldots 0_l, X_{l-1}, X_{l-2}, \ldots X_0$).

Possible uses of the above formulae are explained below:
In order for a receiving communication device to compute the CRC of M with IV=$IV_0$ (in our case $IV_0$=0) while the receiving communication device only comprises hardware or software computing the CRC of M with IV=$IV_1$, other than by re-implementing a CRC method, one may XOR M with a first constant $K_1$, and use the device or software to compute the CRC on M XOR $K_1$. If the second formula above is needed (CRC computed on data shorter than the CRC register), an additional step has to be performed, during which the result of the CRC provided by the device or software is XORed with a second constant $K_2$ (in the first formula $K_2$=0).

In preferred embodiments, most CRCs are calculated on t-bit data (because most CRCs are computed on the output of a previous CRC), therefore l=t and the first formula is used. When l=t, the formula is simplified. One simply has to XOR the data with $IV_0$ XOR $IV_1$ before calling the CRC. In fact, since $IV_0$=0 in our case, one simply has to XOR the data with $IV_1$. In preferred embodiments, the payload is bigger than the size t of the CRC register, therefore in rare instances where the CRC is performed on data which length is not t, the CRC is typically performed on data which length is l, le being greater than t. Consequently the first formula (l>=t) is used more frequently than the second one.

In order to check the integrity of a set of data packets payloads which integrity check value has been computed (and sent) by the sending communication using a CRC with IV=$IV_1$, wherein $IV_1$ is not zero, the receiving communication device can use the following method based on the above formulae.

The received integrity check value (denoted R_CRC) is equal to CRC(M,$IV_1$). The receiving communication device cannot use CRC(M,$IV_1$) in the context of the invention because such CRC (with non zero IV) does not satisfy the mathematical properties needed for the invention. But the receiving communication device can use the above formula: CRC(M, $IV_1$)=CRC(M XOR $K_1$, $IV_0$) XOR $K_2$ (the names $IV_1$ and $IV_0$ have been swapped for legibility, which does not affect the formula as the names are purely conventional).

This formula can also be written:

$$CRC(M \text{ XOR } K_1,IV_0)=CRC(M,IV_1) \text{XOR } K_2=R\_CRC \text{ XOR } K_2$$

R_CRC XOR $K_2$ can be easily computed by the receiving communication device. Instead of verifying the integrity of M, the receiving communication device now has to verify the integrity of M XOR $K_1$. At first sight, this may seem a strong constraint, since it could imply that the whole set of data packets payloads has to be buffered in order to be XORed with $K_1$ before being processed. This would be very inconvenient if M were big. However, as seen in the above first formula (applicable to this situation), $K_1$ affects at most t bits of the message M, and t is typically small. in rare instances where t is bigger than the size of the payload of a single data packet, the receiving communication device simply needs to buffer those data packets which are affected by $K_1$ (i.e. very, few packets).

Although it has been shown that it is possible to handle a R_CRC computed with a non-zero IV, it is preferred to avoid such situations by using zero as an IV in the sending communication device.

Depending on the implementation, the polynomial g(x) reducing the expression in the CRC computation may be used in reverse representation (a.k.a little-endian representation). In this case, the final XOR ($IV_0$ XOR $IV_1$) is to be performed with reverse representation of $IV_0$ and $IV_1$.

For example, using an hexadecimal representation, let us consider M=0x5D and the CRC-16-CCITT with polynomial in normal representation (a.k.a big-endian representation) 0x1021. Let $IV_0$=0x064C, $IV_1$=0x1DCD and $IV_2$=$IV_0$ XOR $IV_1$=0x1B81.

CRC-16-CCITT(M, $IV_0$)=0xA1D2.

However, if one is unable to compute CRC-16-CCITT with an IV equal to $IV_0$, but only able to compute it with an IV equal to $IV_1$, then:

$$CRC\text{-}16\text{-}CCITT(M, IV_0) = [CRC\text{-}16\text{-}CCITT((0 \times 5D \; XOR \; 0 \times 1B), IV_1)]$$
$$XOR [0 \times 1B81]$$
$$XOR [0 \times 0081]$$
$$= 0 \times A1D2$$

In the rest of the description, it is assumed that the CRC has an initial value IV equal to zero since it has good mathematical properties. In particular padding the message with leading zero bits does not change the value of the CRC. This typically makes it useless to mention the expand function inside parameters of such CRC, even for clarity. It is possible to adapt CRCs with non-zero IV to CRC with IV equal to zero with the above technique. In the rest of the description, CRC(M) stands for the CRC of M computed with an initial value IV equal to zero.

By studying the mathematical properties of CRC, the applicant has designed a preferred method for computing a CRC in the context of the invention. The notations used above for mathematically defining a CRC are no longer used in the rest of the document (in particular, parameters n and k will have different meanings as explained below).

The method is based on the following formula, devised by the applicant; which is true for any CRC as mathematically defined above:

$$CRC(set) = XOR_{i=1 \ldots L}(CRC(hi_{t,si}(int\_crc\_pl_i))XOR \\ ((lo_{t,t-si}(int\_crc\_pl_i)) \ll si))$$

where:

set is a set of ordered data packets which CRC has to be computed (only the payloads $pl_i$ of the data packets are processed, other elements of the data packet are not taken into account in the computation of the CRC);

int_crc_$pl_i$ is equal to $CRC^{1+floor((L-i)*k/t)}(pl_i)$, wherein floor(x) denotes the greatest integer lower than or equal to x, wherein $CRC^1(X)=CRC(X)$, and wherein $CRCP^p(X)=CRC(CRC^{p-1}(X))$ for p>1;

$pl_i$ denotes the payload of the $i^{th}$ sent data packet ($pl_1$ is the payload of the first data packet that was sent, $pl_L$ is the payload of the last data packet that was sent), the size of each payload $pl_i$ being constant and equal to k. The size of the output of the CRC is denoted t;

si is equal to (L-i)*k mod t, i.e. the remainder of the division of (L-i)*k by t;

$hi_{t,z}(X)$ is defined for numbers X represented as at bit register. $hi_{t,z}(X)$ is equal to the number consisting of the z most significant bits of X. In other words, if the binary representation of X is $X_{t-1}, X_{t-2} \ldots X_0$ where each $X_i$ is a bit, $hi_{t,z}(X)$ is equal to the number which binary representation in a t bit register is $0_{t-z-1}, 0_{t-z-2}, \ldots 0_0, X_{t-1}, X_{t-2}, \ldots X_{t-z}$;

$lo_{t,z}(X)$ is defined for numbers X represented as at bit register. $lo_{t,z}(X)$ is equal to the number consisting of the z least significant bits of X. In other words, if the binary representation of X is $X_{t-1}, X_{t-2} \ldots X_0$ where each $X_i$ is a bit, $lo_{t,z}(X)$ is equal to the number which binary representation in at bit register is $0_{t-1}, 0_{t-2}, \ldots 0_z, X_{z-1}, X_{z-2}, \ldots X_0$;

the operator is the shift left operator. In other words, if the binary representation of X is $X_{t-1}, X_{t-2} \ldots X_0$, then the binary representation of X<<z is $X_{t-1-z}, X_{t-2-z}, \ldots X_0, 0_{z-1}, 0_{z-2}, \ldots 0_0$ A pseudo code implementing a preferred method based on the above formula is represented on FIG. 2.

According to this method, the payloads of all data packets of the set are of equal size k. The integrity check value of the last sent data packet is not counted in the payload of the last sent data packet.

L denotes the number of data packets, in the set. t denotes the size of the output of the CRC in bits. floor(x) denotes the greatest integer lower than or equal to x. The intermediate integrity check value is stored in a variable r initialized with 0. The integrity check comprises:

a. receiving a data packet and extracting its payload (pl) and index (i), wherein the index (i) is the order of the data packet in the set as sent, wherein index 1 stands for the first sent data packet and index L stands for the last sent data packet, b. recursively calculating the CRC of the payload (pl) i times, the final result being denoted int_crc_pl. int_crc_pl is equal to $CRC^i(pl)$, wherein $CRC^1(pl)=CRC(pl)$ and $CRC^j(pl)=CRC(CRC^{j-1}(pl))$ for j between 2 and i.

c. calculating the CRC of the number consisting of the si most significant bits of int_crc_pl, wherein si is equal to (L-i)*k mod t, d. shifting left by si bits the number consisting of the t-si least significant bits of int_crc_pl, e. XORing the result of steps c and d with r, and storing the result in r, and repeating steps a to e until all data packets of the set have been received.

It should be noted that the order of steps c and d does not matter, and it is equivalent to do first d and then c. The XOR operation is associative and commutative therefore the order of the XORs in step e doesn't matter. It should also be noted that if k is a multiple of t, steps c and d are significantly simplified since si=0. In such case, step c and d can be omitted, and step e consists in XORing int_crc_pl with r and storing the result in r.

The data packets can be for example IP packets, or SMS messages (which according to ETSI 03.40 standard are not necessarily protected by an integrity check).

A step by step description of the implementation depicted on FIG. 2 follows.

The depicted implementation omits the initialization of the variables for the sake of simplicity, and focuses on the loop executed when a data packet is received.

The first instruction, pac=receive_packet( ), means that a packet is received and stored in a variable denoted pac. The received packet typically triggers an interruption which wakes up the receive_packet function, but other solutions are possible (e.g. regular polling in order to check whether a packet is received).

The following instruction, s=read_set_id(pac) means that the identifier of the set to which the packet belongs is extracted from the packet.

Next, the instruction nb_received_packets[s]=nb_received_packets[s]+1 means that a variable nb_received_packets, which is a vector, and which contains the number of received packets for each set currently being received, is incremented in order to reflect the fact that a new packet was just received for set s. Each element of the vector is associated with one of the sets for which at least one data packet has been received, but for which not all data packets have been received. The size of the vector can be determined according to the type of communication network. For example, if in a given network no more than 5 sets can overlap, it is sufficient to allocate 5 elements in the vector. N.B. the 5 overlapping sets are not necessarily contiguous (there might be non-overlapping sets in between). For example, a sending communication device can send 10 consecutive sets {Set1} . . . {Set10}. The receiving communication device may receive them in the following order: {Set1}, {Set2}, {beginning of Set3}, {Set4}, {Set5}, {Set6}, {end of Set3}, {Set7}, {Set8}, {Set9}, {Set10}. In this example, although the overlap spans four sets (Set3 to Set6), only two sets overlap at any point in time, therefore only two elements in the vector are needed. To be more specific, Set3 start overlapping with Set4, but as soon as Set4 has been completely processed Set3 does not overlap with Set4 anymore but starts overlapping with Set5, and as soon as Set5 has been completely processed, Set3 does not overlap with Set5 anymore but starts overlapping with Set6.

Next, the instruction i=read_packet_index(pac) means that the packet index is extracted from the packet. The packet index is the order of the packet in the set s.

In preferred embodiments, the packet is an IP packet, and both the packet index i and the set identifier s are stored in the Identification field of the IP packet header. This is very advantageous for several reasons. In particular, thanks to the Identification field, no extra bandwidth is needed since the IP header would have been sent anyway (and would have carried an empty Identification field). This is to be compared with other protocols such as for example the TCP protocol over IP, in which a special field has to be used in the TCP header in order to store a 32 bit sequence number already described above, and which is added to the IP header. The sequence number has a role similar to the set identifier s and packet index i, but imposes a 32 bit overhead in each packet. In addition, the fact that s and i are stored in the IP header means that they are protected by the IP header checksum, and if there is a transmission error on i and/or s, the IP packet will be resent without requiring the whole set of IP packets being processed and then totally resent due to the error. The identification field is only 16 bits long but this is amply sufficient in preferred embodiments. It can contain for example a 6 bit set identifier and a 10 bit packet index, which would allow to manage up to 64 different set identifiers and 1024 packets per set. In typical embodiments of the invention, it is very unlikely that a set is delayed so long that it arrives later than 63 other sets sent after this set. But it is also possible to use different values depending on the particular context, for example the method may be able to manage 128 sets (7 bits) of 512 packets (9 bits), or any other combination (b bits for s and 16-b bits for i). According to the IP protocol, the identification field is normally an identifying value assigned by the sender to aid in assembling the fragments of a datagram. The identification field is rarely used in practice, since some experts state that less than 0.25% of IP packets on the Internet are fragmented. In the context of the invention, packets are typically small enough to never be fragmented, therefore the use of the identification field is not problematic. With this embodiment, the bandwidth overhead of the method is t bytes per set of data packets, where t is the size of the CRC. For example, if there are 256 data packets per set, and if CRC16 is used, the overhead is equal to 16 bits per set. With TCP, the overhead would be 256*(160+options) bits, since the TCP header takes at least 160 bits (more if options are used). Therefore the overhead in such configuration is at least 2560 times smaller with the invention than with TCP/IP. This is very significant especially for small data packets, which are very sensitive to the overhead.

Next, the instruction if i=L, checksum[s]=extract_set_integrity_check(pac), means that if the packet which has just been received is the last sent packet of the set, the integrity check is contained in this packet and should be retrieved. The integrity check is typically stored in the payload of the data packet, unless the header or trailer contains an unused field which could contain it. In preferred embodiments, the integrity check is stored in the payload of the last IP packet of the set. However, the integrity check is not considered as part of the payload by the method, although for the network it is part of the payload. For example, if each data packet has a payload of 20 bytes, then the last data packet would have a payload of 22 bytes (if CRC16 is used), including 20 bytes of "real" payload and 16 bits of integrity check value. The integrity check value is stored in a vector checksum which structure is similar to the above discussed structure of nb_received_packets.

Next, the instruction pl=extract_payload (pac) extracts the payload of the packet (not including the integrity check if this is the last packet). The extraction may simply consist in providing a pointer to the payload.

Next, the instruction manage_payload(pl) lets the communication use the payload as intended. It should be noted that the payload is managed just after the packet has been received (almost no delay). Indeed, the instructions between the receive_packet and the manage_payload instructions are simple read/write operations requiring almost no time to execute. If the data is fault resistant (as defined above), it can be managed as if its integrity had been checked, although there might be some minor side effects as explained above. If the data is fault sensitive, it can also be managed, however this may lead to a completely erroneous result until the correct data packet is received and processed. This is not necessarily problematic. For example, in a distributed computing application such as online gaming, in which hundreds of users may be connected to a game server in parallel and play in a common environment, the server may send the elements of the scenery (e.g. in a multi-player flight simulator game). For example, it can send the identifier and position of moving objects such as cars (on roads) and boats (on a lake), which each game console (e.g. a cellular phone game console) interprets and displays accordingly. Those parameters are error sensitive, in the sense that if there is even a single bit error in the identifier, the object may be completely wrong (a boat can be replaced by a cow or a harvester), and if some of the most significant bits of the position are wrong, the object will be displayed in a totally wrong position. However, the object will be quickly replaced by the right object, and the display of the wrong object doesn't have bad consequences in general (except if a boat ends up in the middle of a landing strip while the player is trying to land, or similar unlikely events).

Optionally, manage_payload(pl) may comprise additional parameters, such as manage_payload(pl, i, s), which give information on the position of the payload in the set and may let the application sort certain packets (e.g. if certain packets must be managed before certain other packets), or identify certain packets. For example, it may be that the structure of the set of packets is always the same and that the contents of a data packet can be inferred from its index, at least for certain indexes.

Optionally, the data packet payload can contain a flag indicating that it contains critical data which shouldn't be managed until its integrity check is verified, or which can be managed by anticipation but should have some elements kept in memory in order to be able to "roll back" in case the payload appears to be wrong, or is susceptible to be wrong (since the integrity check is performed on the whole set, the actual payload might be correct, but there is not necessarily a way to check it so it may have to be resent—by default all data packets of the set are resent). The "roll back" consists in coming back to the state before the payload was managed. In this case, the manage_payload function may put the address of the payload (and/or of other relevant information) in a stack (one stack per set). When the set integrity is checked, it is then necessary to process all stacked payloads.

Next, the instruction int_crc_pl=CRC(pl) computes the CRC of the payload, and the instruction free(pl) frees the payload from memory (optionally, it only frees the payload if it contains no critical data, i.e. if the critical data flag is no set).

Next, the loop for p=1 to floor ((L−i)*k/t), int_crc_pl=CRC (int_crc_pl) calculates the CRC of int_crc_pl x times, wherein x=floor ((L−i)*k/t) which produces the result of the recursive calculation described herein above in step b for calculating $CRC^i(pl)$.

Next, the instruction si=(L−i)*k mod t computes the si parameter.

Next, the instruction r[s]=r[s] XOR CRC ($hi_{t,si}$(int_crc_pl)) XOR (($lo_{t,t-si}$(int_crc_pl))<<si) computes the intermediate integrity check value (which corresponds to steps c, d and e, in a single instruction).

Next, the instruction if nb_received_packets[s]=L checks whether all packets of the set corresponding to the last received packet have been received. If all packets have been received, the instruction if r[s]=checksum[s] checks the integrity of the set by comparing the received integrity check value checksum[s] with the computed integrity check value (equal to the last intermediate integrity check value r[s]). If the integrity is correct, the instruction validate_set(s) is called. This instruction can release all memory which was allocated to the set, such as elements with index s of the vectors r, checksum, nb_received_packets, etc. and make them available for a future received set. This instruction can also manage the payloads which were marked as critical and free them. If the integrity is not correct, the instruction else, request_resend(s) is called. This instruction can request the whole set to be resent, and in case some critical payloads were stacked, it can remove them from the stack without managing them (or roll back those which were managed by anticipation thanks to the stacked information). Irrespective of whether the integrity of the set is correct or not, the intermediate integrity check value r[s] is reset to zero with the instruction r[s]=0 in order for the next set which index will be s to be processed properly.

The method can then restart from the beginning, by waiting for the next packet with the instruction, pac=receive_packet( ).

The calculation of the CRC of a set of L data packets according to the above method is approximately L/2 times slower than the calculation of L CRCs of L data packets according to state of the art methods. However, given that a CRC is a fast operation, and it is even faster when it is hardware accelerated, the method does not have a significant impact on the performance This method can be improved in order to be adapted to a multitask environment. Indeed, a CRC engine (whether a software CRC engine or a hardware CRC engine when a CRC hardware accelerator is available), is not necessarily multitask. Typically, computing the CRC of data which is longer than the CRC register requires several accesses to the CRC engine, and each time the CRC engine is called, the state of the engine should be memorized in order that the subsequent call is properly handled. In a multi task environment, different routines might be willing to compute a CRC in parallel, in which case the results of the CRC are corrupted. Some CRC engines are designed to backup their contents for each calling application and restore them when the application calls them again, which solves the issue. However, not all hardware CRC engines allow the initialization of their register, therefore it is not always possible to have them support multitask environments.

For example, in some microcontrollers (e.g. SATURN chip of HP 48 SX calculator), a CRC engine is connected to the data bus of the processor, and in order to compute the CRC of some data, one simply has to set a pointer to the beginning of the memory containing the data, and read the data sequentially. Obviously, if there is an interrupt and if some interrupt routine starts reading data in memory (which any routine does), the data bus is fed with other data which corrupts the initial CRC computation.

With the above method, each call to the CRC module only involves data contained in one CRC register, and is independent of other CRC calls, with one potential exception. The potential exception is the instruction int_crc_pl=CRC(pl). Indeed the payload pl has a length of k bits, which is typically greater than the size t of the CRC register. t is normally equal to the size of the output of the CRC. The improvement consists either in using a block size k equal to t, in which case no change is needed, or in replacing the above instruction by:

int_crc_pl=0
for p=floor((k−1)/t) downto 0
int_crc_pl=CRC(int_crc_pl XOR $lo_{k,t}$(pl(p*t)))

where the operator is the shift right operator. In other words, if the binary representation of X is $X_{k-1}, X_{k-2} \ldots X_0$, then the binary representation of X>>z is $0_{z-1}, 0_{z-2}, \ldots 0_0, X_{k-1}, X_{k-2}, \ldots X_z$. In preferred embodiments, the method is implemented in a communication device which has a CPU. Obviously, if k and t are properly chosen, in particular if they are multiples of the size of the smallest element addressable by the CPU, i.e. typically a multiple of 8 bits in particular on simple CPUs, the use of the right shift operator can be replaced by a direct read operation in memory (the CPU can directly access the relevant sub block instead of computing shift operations on the whole block).

The performance (in terms of speed of execution) is optimal when k and t are powers of 2. t is typically equal to $2^4$ or $2^5$.

With such k and t, remainders and integer divisions or multiplications are simplified by involving simple AND masks and shifts. With many cryptographic devices, it is advantageous to pass the t-bit data (which CRC computation is desired) to the CRC module without indirection (by directly passing the value). This is particularly efficient when the registers of the CPU are t-bit wide or can contain t-bit numbers.

The invention claimed is:

1. A method for checking the integrity of a set of data packets received by a receiving communication device from a sending communication device, each data packet of the set comprises a payload which contains information to be carried in the data packet, the data packets of the set being received in unpredictable order, wherein the method comprising:
   initializing an intermediate integrity check value for the data packets set, and
   a. until all data packets of the set have been received, each time a data packet having an index i of the data packets set is received, the receiving communication device updates the intermediate integrity check value for the data packets set by:
      a.1 computing an intermediate integrity check value for the data packet i wherein the intermediate integrity check value for the data packet i may be computed recursively using the output from one recursion level as input to an integrity check computation at the next higher recursion level using the index i as a parameter defining the recursion depth of the computation,
      a.2 computing an integrity check value on a first portion of the intermediate integrity check value for the data packet i,
      a.3 combining the result of the computation of the integrity check value on the first portion with a second portion of the intermediate integrity check value for the data packet i, and
      a.4 updating the intermediate integrity check value for the data packets set by combining the intermediate integrity check value with the result of the combining of the computation of the integrity check value on the first portion with a second portion of the intermediate integrity check value for the data packet i; and
   b. the receiving communication device receives an integrity check value from the sending communication device, the integrity check value for the data packets set having been calculated by processing the payloads of all the sent data packets of the set according to step a, the integrity check being considered successful if, once all the data packets of the set are received, the intermediate integrity check value for the data packets set is equal to the received integrity check value.

2. The method according to claim 1, wherein the received integrity check value is included in the last packet sent by the sending communication device.

3. The method according to claim 2, wherein integrity check computations are Cyclic Redundancy Code (CRC) computations.

4. The method according to claim 3, wherein the payloads of all data packets of the set are of equal size k, and wherein, L denoting the number of data packets in the set, t denoting the size of the output of the CRC in bits, floor(x) denoting the greatest integer lower than or equal to x, and the intermediate integrity check value being stored in a variable r initialized with 0, the integrity check comprises:
   wherein computing the integrity check value on the first portion (first portion CRC) of the intermediate integrity check value for packet i (int_crc_pl) comprises calculating the CRC of the number consisting of the si most significant bits of int_crc_pl, wherein si is equal to (L−i)*k mod t,
   wherein combining the result of the computation of the integrity check value on the first portion with the second portion of the intermediate integrity check value for packet i comprises
      shifting left by si bits the number consisting of the t-si least significant bits of int_crc_pl, and
      XORing the first portion CRC and the result of the shifting left with r and storing the result in r.

5. The method according to any previous claim, wherein the data packets of the set of data packets are IP packets, or SMS messages.

6. The method according to claim 1, wherein step a.1 of computing an intermediate integrity check value for packet i comprises for each recursion level computing an integrity check on the result from the next lower recursion level unless the recursion level is level one, in which case the integrity check is computed on the packet payload.

7. The method according to claim 1, wherein the recursion depth is defined by floor ((L−i)*k/t) wherein L is the number of data packets in the data set, i is the index of the received packet, k is the size of the data packets, and t is the size of the output integrity check value.

8. The method according to claim 1, wherein the computation of the intermediate integrity check value for packet i is performed iteratively by for each iteration computing an integrity check value on the integrity check value result from the previous iteration.

9. A communication device wherein the communication device is arranged to check the integrity of a set of received data packets from a sending communication device, each data packet of the set of data packets comprises a payload which contains information to be carried in the data packet, the data packets of the set being received in unpredictable order, wherein the communication device comprising:
   a memory and a processor configured to initialize an intermediate integrity check value, and
   a. until all data packets of the set have been received, each time a data packet having an index i of the data packets set is received, the receiving communication device updates the intermediate integrity check value for the data packets set by:
      a.1 computing an intermediate integrity check value for the data packet i wherein the intermediate integrity check value for the data packet i may be computed recursively using the output from one recursion level as input to an integrity check computation at the next higher recursion level and using the index i as a parameter defining the recursion depth of the computation,
      a.2 computing an integrity check value on a first portion of the intermediate integrity check value for the data packet i, and
      a.3 combining the result of the computation of the integrity check value on the first portion with a second portion of the intermediate integrity check value for the data packet i, and
      a.4 updating the intermediate integrity check value for the data packets set by combining the intermediate integrity check value with the result of the combining of the computation of the integrity check value on the first portion with a second portion of the intermediate integrity check value for the data packet i; and
   b. the communication device receives an integrity check value from the sending communication device, the integrity check value for the data packets set having been calculated by processing the payloads of all the sent data packets of the set according to step a, the integrity check being considered successful if, once all the data packets of the set are received, the intermediate integrity check value for the data packets set is equal to the received integrity check value.

10. The communication device according to claim 9, wherein the communication device is a smart card.

11. The communication device according to claim 9 wherein the received integrity check value is included in the last packet sent by the sending communication device.

12. The communication device according to claim 11 wherein integrity check computations are Cyclic Redundancy Code (CRC) computations.

13. The communication device according to claim 12 wherein the payloads of all data packets of the set are of equal size k, and wherein, L denoting the number of data packets in the set, t denoting the size of the output of the CRC in bits, floor(x) denoting the greatest integer lower than or equal to x, and the intermediate integrity check value being stored in a variable r initialized with 0, the integrity check comprises:

wherein computing the integrity check value on the first portion (first portion CRC) of the intermediate integrity check value for packet i (int_crc_pl) comprises calculating the CRC of the number consisting of the si most significant bits of int_crc_pl, wherein si is equal to (L−i)*k mod t, wherein combining the result of the computation of the integrity check value on the first portion with the second portion of the intermediate integrity check value for packet i comprises shifting left by si bits the number consisting of the t-si least significant bits of int_crc_pl, XORing the first portion CRC and the result of the shifting left with r and storing the result in r.

14. The communication device as in one of claim 9, 10, 11, 12 or 13, wherein the data packets of the set of data packets are IP packets or SMS messages.

15. The communication device according to claim 9, wherein the recursion depth is defined by floor ((L−i)*k/t) wherein L is the number of data packets in the data set, i is the index of the received packet, k is the size of the data packets, and t is the size of the output integrity check value.

16. The communication device according to claim 9, wherein the computation of the intermediate integrity check value for packet i is performed iteratively by for each iteration computing an integrity check value on the integrity check value result from the previous iteration.

17. The communication device according to claim 9, wherein element a.1 of computing an intermediate integrity check value for packet i comprises for each recursion level computing an integrity check on the result from the next lower recursion level unless the recursion level is level one, in which case the integrity check is computed on the packet payload.

* * * * *